US007835649B2

(12) United States Patent
Epps et al.

(10) Patent No.: US 7,835,649 B2
(45) Date of Patent: Nov. 16, 2010

(54) OPTICAL DATA SYNCHRONIZATION SCHEME

(75) Inventors: Garry Epps, Sunnyvale, CA (US); Earl T. Cohen, Oakland, CA (US)

(73) Assignee: Cisco Technology, Inc., San Jose, CA (US)

( * ) Notice: Subject to any disclaimer, the term of this patent is extended or adjusted under 35 U.S.C. 154(b) by 936 days.

(21) Appl. No.: 11/361,770

(22) Filed: Feb. 24, 2006

(65) Prior Publication Data

US 2007/0201877 A1 Aug. 30, 2007

(51) Int. Cl.
*H04B 10/00* (2006.01)

(52) U.S. Cl. .................... 398/155; 398/154; 398/161

(58) Field of Classification Search ............... 398/54, 398/154, 102, 84, 87, 161, 155
See application file for complete search history.

(56) References Cited

U.S. PATENT DOCUMENTS

| 4,677,618 | A | * | 6/1987 | Haas et al. ............... 714/700 |
| 5,032,010 | A | * | 7/1991 | Su ........................... 359/241 |
| 5,319,484 | A | * | 6/1994 | Jacob et al. ................ 398/75 |
| 5,469,284 | A | * | 11/1995 | Haas ......................... 398/54 |
| 5,497,261 | A | * | 3/1996 | Masetti ..................... 398/154 |
| 5,506,712 | A | * | 4/1996 | Sasayama et al. ........... 398/47 |
| 5,526,156 | A | * | 6/1996 | Bostica et al. .............. 398/54 |
| 5,535,032 | A | * | 7/1996 | Bottle ........................ 398/151 |
| 5,617,233 | A | * | 4/1997 | Boncek ...................... 398/51 |
| 6,137,610 | A | * | 10/2000 | Patrick ....................... 398/154 |
| 6,144,786 | A | * | 11/2000 | Chethik ..................... 385/24 |
| 6,239,892 | B1 | * | 5/2001 | Davidson .................... 398/154 |
| 6,262,823 | B1 | * | 7/2001 | Nowatzyk ................... 398/141 |
| 6,288,808 | B1 | * | 9/2001 | Lee et al. .................... 398/49 |
| 6,437,889 | B2 | * | 8/2002 | Davidson .................... 398/98 |
| 6,535,661 | B2 | * | 3/2003 | Takahashi et al. ........... 385/15 |
| 6,619,867 | B1 | * | 9/2003 | Asahi ......................... 398/154 |
| 6,690,891 | B1 | * | 2/2004 | Le Sauze et al. ............ 398/154 |
| 6,775,343 | B1 | * | 8/2004 | Gambini et al. ............. 375/373 |
| 6,778,536 | B1 | | 8/2004 | Ofek et al. |
| 6,957,018 | B2 | | 10/2005 | Araki et al. |
| 7,177,544 | B1 | * | 2/2007 | Wada et al. .................. 398/51 |
| 7,305,186 | B2 | * | 12/2007 | Islam ......................... 398/51 |
| 7,313,329 | B2 | * | 12/2007 | Yoo et al. .................... 398/58 |
| 7,428,383 | B2 | * | 9/2008 | Maciocco et al. ............ 398/45 |
| 2002/0080450 | A1 | * | 6/2002 | Hait ........................... 359/158 |

(Continued)

OTHER PUBLICATIONS

Xu et al., Techniques for optical packet switching and optical burst switching, IEEE Communications Magazine, Jan. 2001, pp. 136-142, v. 39, issue 1, New York, U.S.A. (http://www.comsoc.org/ci/private/2001/jan/pdf/xu.pdf).

(Continued)

*Primary Examiner*—Agustin Bello
(74) *Attorney, Agent, or Firm*—Stolowitz Ford Cowger LLP (57) ABSTRACT

Asynchronous optical data is aligned with synchronous convergence points in an optical packet switching system. The convergence points can be any place where data enters an optical packet switching element, buffer stage, switch fabric, etc. The arrival time for data approaching the convergence point is compared with a reference signal associated with the upcoming convergence point. The comparison is used to identify the amount of time-shift required to align the approaching data with the reference signal. Control information is derived according to the comparison and used to control an optical data aligner that synchronizes the data with the convergence point.

29 Claims, 10 Drawing Sheets

U.S. PATENT DOCUMENTS

2003/0095312 A1* 5/2003 Zami et al. ............... 359/158
2005/0041970 A1* 2/2005 Harai ........................ 398/51
2006/0008273 A1* 1/2006 Xue et al. ................... 398/51

OTHER PUBLICATIONS

Hunter, David K., "Optical Packet Switching—Tutorial for WAON '98", Dept. of Electronic and Electrical Engineering, University of Strathclyde, May 1998.

Ganesan, Kalpana, "Optical Packet Switching: Advances and Contention Resolution", CSCE 990 Networks Systems Seminar, Feb. 26, 2002, Microsoft® PowerPoint® presentation, 22 pages.

"Contention Resolution using Delay-lines", Introduction, http://www.stanford.edu/cord.html, last updated Apr. 16, 2003, 2 pgs.

NTT Photonics Laboratories, "Optical packet synchronization in optical layer", Jul. 15, 2003, 1 pg.

Ku, Pei-Cheng, et al., "Variable optical buffer using slow light in semiconductor nanostructures", *Proceedings of the IEEE*, vol. 91, No. 11, Nov. 2003, 31 pages.

Takahashi, Ryo "Recent Progress in Optical Packet Processing Technologies for Optical Packet-switched Networks", *NTT Technical Review*, vol. 2, No. 7, Jul. 2004, pp. 12-22.

International Search Report for PCT/US06/060229; Date of mailing Oct. 15, 2007; ISA/US.

International Preliminary Report on Patentablity and Written Opinion of the ISA for PCT/US06/060229; Date of mailing Oct. 15, 2007; ISA/US.

Stolowitz Ford Cowger LLP, Listing of Related Cases, Aug. 12, 2009.

\* cited by examiner

OPTICAL DATA SYNCHRONIZATION SCHEME

FEDERALLY SPONSORED RESEARCH OR DEVELOPMENT

This invention was made with U.S. Government support under Agreement No. W911NF-04-9-0001, awarded by the Army Research Laboratory. The United States Government has certain rights in the subject matter of this invention.

BACKGROUND

Optical packet switches and routers process packets in an optical domain. Optically switching packets presents challenges that may not exist in electronic packet switching equipment. For example, packets can arrive asynchronously on various input links on the packet switching device. In an electronic router, the data is synchronized relatively easily link interface. For example, the asynchronously arriving packets can be stored in a First In-First Out (FIFO) buffer while waiting for subsequent packet processing. Packets are written into the FIFO when they arrive and are read only when the downstream packet processing stage is ready.

However, in optical switching architectures there are no equivalent elastic buffering devices. Thus, problems can arise when one or more asynchronous packet streams converge at some synchronous processing point (a.k.a., convergence point). In one example, the convergence point could be, but is not limited to, a synchronous switch fabric. The switch fabric, regardless of the existence of Virtual Output Queues (VOQs), may include optical input buffers preceding different synchronization convergence points. Other convergence points can include optical output buffers or output interfaces without buffers that may be connected to an asynchronous switch fabric (e.g., a mesh). Unfortunately, optical buffers are typically synchronous devices in that the time difference between when data enters and leaves is a multiple of a fixed delay.

Various optical buffer architectures have been proposed in the past, and some have been implemented for testing. There are two basic methods currently used to avoid packet contention at a convergence point. One technique uses some type of delay and the second technique uses some type of avoidance. The avoidance schemes, as the name suggests, avoid the contention problem but only work to a limited scale.

The delay schemes use an optical packet "aligner" circuit on each path to the convergence point. The packet aligners simply delay the incoming signal on each path by a preconfigured constant amount. Unfortunately, it is difficult to control the aligner circuits for each packet on each path. Further, these delay schemes do not take into account asynchronously arriving packets and therefore do not have the capacity to synchronize these asynchronous packets with a synchronous optical convergence point.

The present invention addresses these and other problems associated with the prior art.

SUMMARY OF THE INVENTION

Asynchronous optical data is aligned with synchronous convergence points in an optical packet switching system. The convergence points can be any place where data enters an optical packet switching element, buffer stage, switch fabric, etc. The arrival time for data approaching the convergence point is compared with a reference signal associated with the upcoming convergence point. The comparison is used to identify the amount of time-shift required to align the approaching data with the reference signal. Control information is derived according to the comparison and used to control an optical data aligner that synchronizes the data with the convergence point.

The foregoing and other objects, features and advantages of the invention will become more readily apparent from the following detailed description of a preferred embodiment of the invention which proceeds with reference to the accompanying drawings.

DETAILED DESCRIPTION

The area of optical packet switching focuses almost entirely on device-level research. Usually, there is discussion of the blocks required to make a system, without any practical solutions as to how to resolve the problem of gluing different optical components together. The optical packet synchronizer described below provides a system solution for handling asynchronous data in an optical packet processing system.

It should be understood that the optical packet synchronizer described below can be used in any optical processing device with one or more convergence points that requires synchronous optical data processing of asynchronously received optical data. Optical processing devices using the optical packet synchronizer can be any type of optical packet switch, router, gateway, head-end, firewall, Digital Subscriber Loop (DSL), Time Division Multiplexing (TDM), Asynchronous Transfer Mode (ATM) device, etc. However, for simplicity, the examples below will refer to any of these devices generally as an optical packet switching system.

The term packet is used to refer to an associated collection of data bits, generally containing source and/or destination information that may be present in a header or in some other portion of the data. In electrical networking, a packet usually can have a variable length, with information in the packet providing its exact length in bytes or some other unit. A cell in electrical networking usually refers to packets of a fixed, small size. For example, an ATM network uses cells, whereas an IP network uses packets.

In the context of optical switching, and as described below, the term packet is used to refer to a collection of data bits that are moved, routed, switched, etc., as one unit. Unlike the electrical networking usage, however, packets in optical networking may typically be a fixed size, or at least a fixed, small, maximum size, and thus might more properly be called cells. For the purposes of the explanation below, the exact size of the data contained in a packet is not relevant, and the term packet is used to refer to either packets, cells, or any other type of data.

Figure 1:
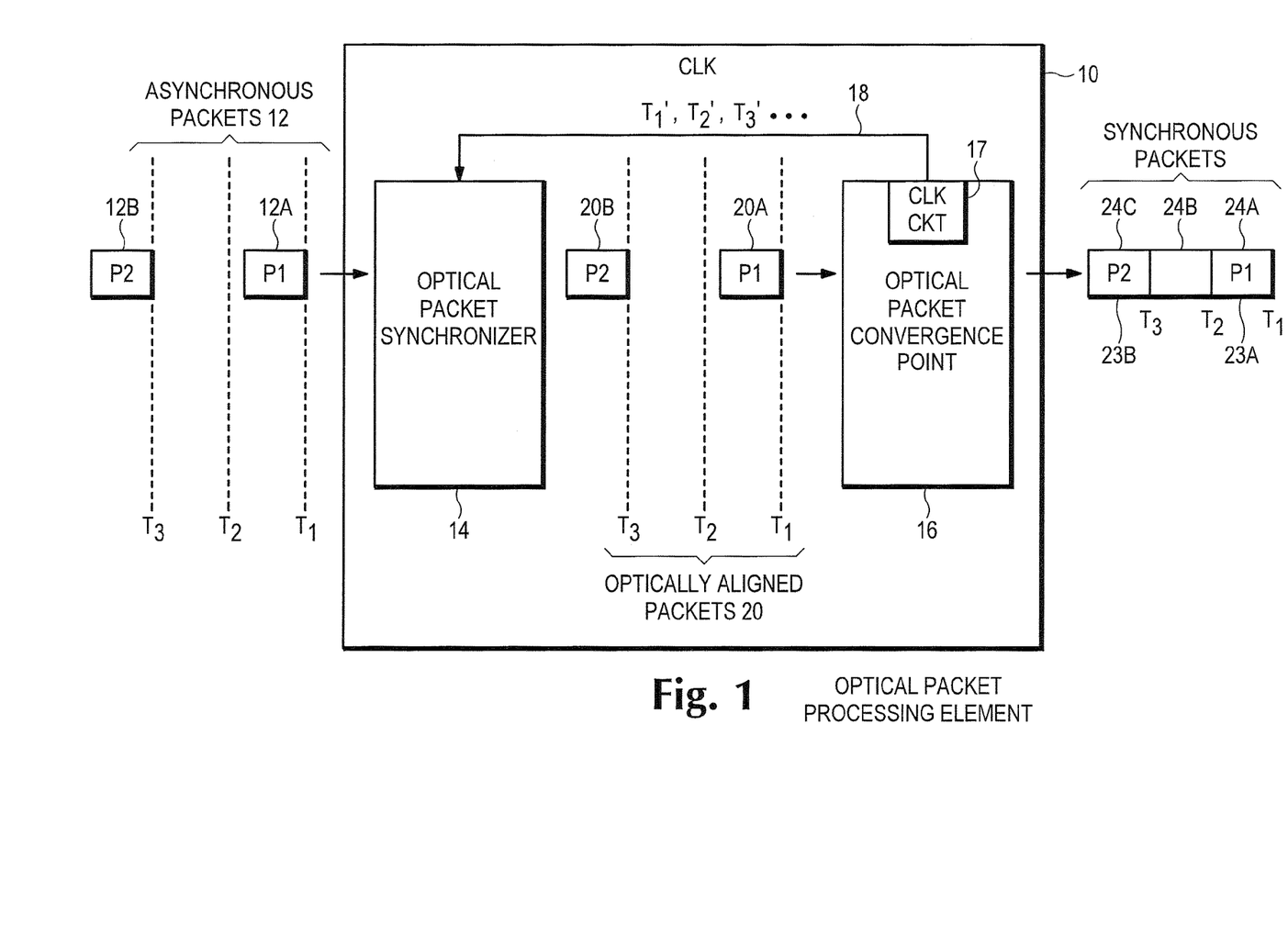
FIG. 1 is a block diagram showing an optical packet synchronizer used in an optical packet switching system.

FIG. 1 shows an optical packet processing element 10 that includes both an optical packet synchronizer 14 and an optical packet convergence point 16. In this example, the optical packet convergence point 16 can be any location in an optical packet switching system that conducts some sort of synchronous optical packet processing. For example, the optical packet convergence point 16 can be an optical buffer (input buffer, output buffer), packet switching or routing logic, switch fabric, or any other type of component that needs to synchronously process optical data.

In another example, the optical packet convergence point 16 may be any packet processing point that would normally follow a First In First Out (FIFO) buffer or some other type of memory or buffer device in an equivalent electronic packet processing device. The FIFO or other buffering device would normally store asynchronously received packets for some variable time period prior to being synchronously processed by other packet processing circuitry. However, as described above, there are currently no optical equivalents to these electronic buffering devices that store packets for indefinite periods of time prior to being synchronously dequeued for subsequent packet processing.

The optical packet synchronizer 14 resolves these optical processing limitations by synchronizing asynchronously received packets 12 with optical packet convergence point 16. For example, asynchronous packets 12 may be received at some ingress point to the optical packet processing element 10. This ingress point could be an input port for the optical packet switching system that receives optical packets from some future developed optical Wide Area Network (WAN) or any other type of optical network. Alternatively, the ingress point could be some other internal location in the optical packet switching system.

In one example, the optical packet convergence point 16 may need to buffer, interleave, switch, route, etc., the incoming packets 12 in some sort of synchronous manner prior to being output in a synchronous time domain as packets 23. For example, the packets 23 may be output in time slots 24 that start and stop on particular time intervals that are associated with a reference clock 18 generated by a clock circuit 17.

The optical packet synchronizer 14 detects when the asynchronous packets 12 arrive at the optical packet processing element 10. The arrival time for packets 12 are compared with the phase of reference clock 18. Any packets already in phase with the reference clock 18 may not need further alignment and may be passed through to the optical packet convergence point 16. Any out of phase packets 12 are aligned with reference clock 18. For example, asynchronous packet 12A is received on an input just-slightly ahead of the start time for a first time period $T_1$. Accordingly, the optical packet synchronizer 14 delays packet 12A a small amount to align with the start of time period $T_1$. This is shown as aligned packet 20A in FIG. 1.

Another packet 12B arrives at the input of optical packet processing element 10 approximately half way into the phase of time period $T_2$ and extends approximately half way into the phase of a second time period $T_3$. Accordingly, the asynchronous packet 12B is delayed by the optical packet synchronizer 14 to align with the start of time period $T_3$. This is shown as aligned packet 20B.

The optically aligned packets 20A and 20B can then be synchronously processed by the optical packet convergence point 16. For example, as described above, the optical packet convergence point 16 may include switching circuitry that outputs packets 23A and 23B in time slots 24A and 24C, respectively, that are synchronized with the reference clock 18.

The reference clock 18 could be global, or in some embodiments might be per-path or per some set of paths. This will be described in more detail below in FIGS. 8-10. The logic in optical packet synchronizer 14 can be implemented in a variety of ways and may depend on the type of optical packet aligner used for delaying the packets.

Figure 2:
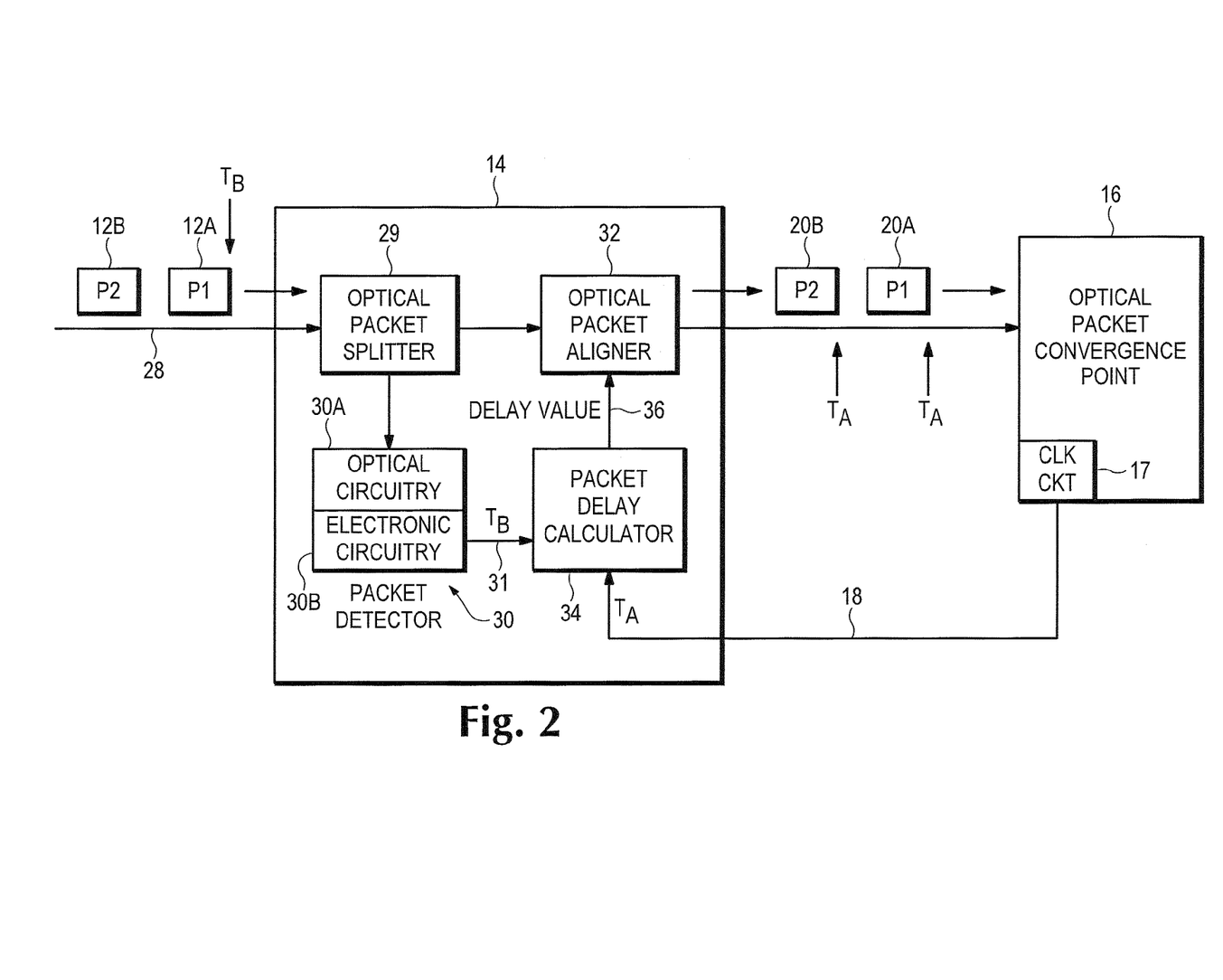
FIG. 2 is a block diagram showing the optical packet synchronizer in FIG. 1 in more detail.

FIG. 2 shows one example of the optical packet synchronizer 14 in more detail. In this example, the optical packet synchronizer 14 may include different configurations of optical and electronic circuitry or logic. In one example, an optical packet splitter 29 directs the packets 12 to both an optical packet aligner 32 and a packet detector 30. The packet detector 30 may include a combination of optical components or circuitry 30A and electronic circuitry 30B.

Electronic circuitry 30B in packet detector 30 and in a packet delay calculator 34 may be implemented using discrete digital and/or analog electronic circuitry, Programmable Array Logic (PAL), Application Specific Integrated Circuitry (ASIC), etc. Alternatively, the packet detector electronics 30B and time delay calculator 34 may be implemented in software using a programmable processor. In yet another embodiment, some or all of the electronic operations performed in packet detector 30 and packet delay calculator 34 may be implemented using optical components.

In other implementations, the packet detector 30 and packet delay calculator 34 may be part of the same circuitry and performed at essentially the same time. However, for explanation purposes, the two operations are shown as separate functional blocks in FIG. 2.

In this example, the packet detector 30 first determines at what point in time $T_B$ each packet 12 is asynchronously received. In one embodiment, the time $T_B$ may be determined by detecting data in the headers of packets 12 or by detecting a sync pulse in the packets 12. Other detection techniques may include detecting an optical frequency associated with the transmission of header information in optical packets 12. In yet other implementations, the time $T_B$ may be associated with the ends of packets 12 or with some other reference points in the packets 12.

The packet detector 30 may asynchronously generate a signal associated with time $T_B$ whenever the reference points in packets 12 are detected. In another embodiment, the packet detector 30 may detect or sample the signal or signals on input 28 according to some time period or sub-period of reference clock 18. Many different techniques currently exist for detecting the arrival of packets and any of these techniques can be used by packet detector 30.

Packet Delay Calculation

The packet detection time $T_B$ is compared with the reference clock 18 in packet delay calculator 34 to determine an amount of delay that should be applied to the associated packets 12. For example, the time delay calculator 34 may compare a signal 31 output from packet detector 30 at time $T_B$ with the beginning of a next reference clock period $T_A$. The time difference between the detected packet time $T_B$ and the start of the next reference clock period $T_A$ can then be used to calculate an appropriate delay value 36.

In one implementation, the clock circuit 17 in the optical packet convergence point 16 may generate a count value that counts at some subinterval of the reference clock period $T_A$. For example, if the reference clock period $T_A$ is 10 ns, the count value may count up or down between 0 and 10 in 1 ns time increments. The packet delay calculator 34 identifies the count value provided by reference clock 18 that corresponds with the packet detection time $T_B$ and outputs a corresponding delay value 36. Of course this is just one example and any time period and sub-period time increment can be used.

Alternatively, the packet delay calculator 34 can include an up counter or down counter that counts in fractional units of packet times. In this embodiment, the reference clock 18 may be a one-shot, clock pulse, etc., that initializes, clocks, resets and/or synchronizes the counter in packet delay calculator 34.

For example, in either of the counter configurations described above, at the start of a "round", a value of 1.0 in the counter may be associated with a packet that requires a full packet time delay for alignment with the phase of reference clock 18. At the end of a round, a value of 0.0 may mean that the packet requires no delay to be aligned with the phase of reference clock 18. However, the packet may still be subject to a delta delay value (Δ) and/or epsilon value (ϵ) due to other fixed and/or variable processing delays in the optical switching device. This will be described in more detail below in FIG. 3. After reaching 0, the down counter starts over at 1.0 to indicate the next round, or the beginning of a next reference clock phase.

Figure 3:
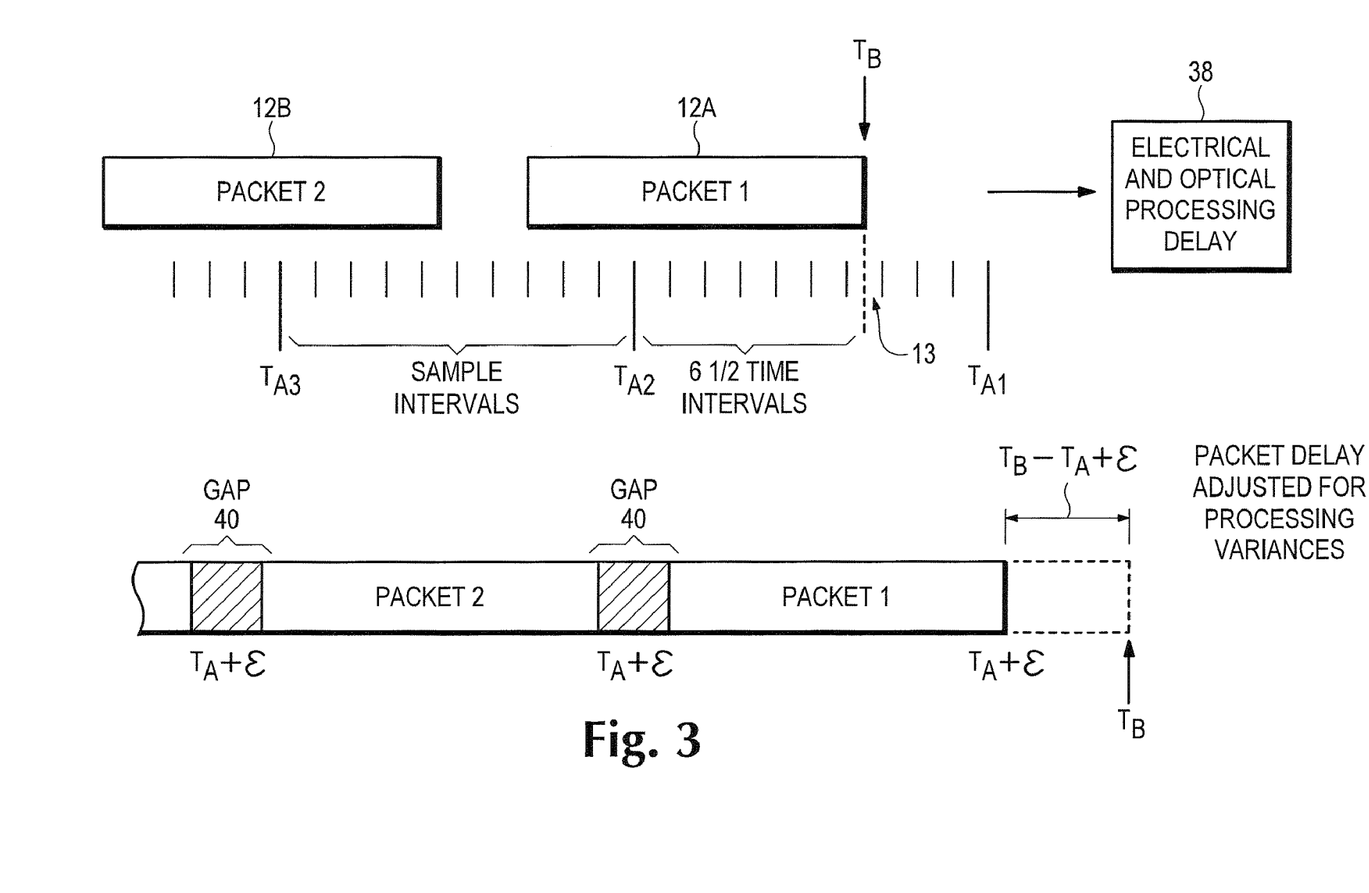
FIG. 3 is a diagram showing how a delay value generated by the optical packet synchronizer accounts for different packet processing characteristics.

This is illustrated in FIG. 3 where the packet detector 30 in combination with the packet delay calculator 34 identifies the sub-interval 13 when the packet 12A is detected. The identified subinterval 13 is then used in part to determine the delay value 36 in FIG. 2 used for delaying packet 12. In FIG. 3, the packet 12A is detected during the fourth sub-interval 13 of a ten sub-interval time period. Accordingly, the packet 12A may need to be delayed six time intervals to align with the start of a next time period $T_{A2}$.

If the count value provided by the clock circuit 17 in the optical convergence point 16, or provided by a counter in the packet delay calculator 34, counts in binary from a power-of-two minus 1 down to 0 (e.g., from 15 down to 0), the bits in the binary counter value can be used to enable delays of power-of-two fractions of the sample interval. For example, if the counter had a value 0.1101 at the packet detection time $T_B$, that would indicate the need for delays of ½, ¼, and 1/16 of the sample interval. The counter could also be implemented to count in bases other than base two for handling non-power-of-two-sized delay elements, etc.

However determined, the delay value 36 is then used by the optical packet aligner 32 to align the packets 12 with the reference clock 18. This is shown by packets 20A and 20B in FIG. 2 that are synchronized with the beginning of successive clock periods $T_A$ associated with reference clock 18.

As mentioned above, the packet detector 30 and clock delay calculator 34 in FIG. 2 may determine the required delay value 36 according to reference points other than the beginning of the packets 12. For example, the time $T_B$ may be associated with the head of each packet, or if packets are of a fixed size, $T_B$ could be associated with the tail of the packet, or any other fixed point in the packet.

It should also be noted that the control signals used for controlling the optical packet aligner 32 may use any combination of digital, analog, or optical signaling. For example, any combination of the signal $T_A$, signal $T_B$, and the delay value 36 may be either analog, digital, or optical signals.

In yet another alternative situation, received data may be associated with some fixed time period or may have some sort of synchronous relationship. For example, the incoming packets may be transmitted over fixed time TDM cells. However, the phase of these fixed TDM cells might not be synchronized, or may drift, with respect to the reference clock 18 associated with optical packet convergence point 16. In this embodiment, the packet aligner 32 may only need to be updated every n'th packet, rather than every packet, under the assumption that drift is within some defined tolerances.

Compensating for Processing Variables

The optical packet synchronizer 14 may also account for variances in the optical packet processing. There are two types of variances to be considered: fixed delays delta (Δ), such as processing times, and uncertain delays epsilon (E), such as inaccuracies or imprecision in time measurements.

The fixed delays Δ can be accounted for by the phase clock delay calculator 34. For example, if it is known that the fixed delays between the packet detector 30 and the optical packet convergence point 16 amount to a total delay of delta (Δ), then the delay calculator 34 can produce a delay value of $T_B-T_{A2}-\Delta$ to account for this fixed delay. That is, the optical packet aligner 32 may provide less delay due to these other fixed delays in the path.

The foregoing assumes that the delays in packet detection and delay value generation are minimal. In actuality, the path from optical packet splitter 29 to optical packet aligner 32 has a certain minimum delay which may be more than the delay from optical packet splitter 29 through packet detector 30 and packet delay calculator 34 to delay value 36. If the former delay is smaller than the latter, then Δ would be negative, which could make the total required delay be negative. The system could also be designed so that Δ is greater than or equal to zero by ensuring that the delay on the packet data path from optical packet splitter 29 to optical packet aligner 32 exceeds the delay on the control path which generates the delay value.

The second type of variance epsilon (ϵ) is variable and might not be budgeted for in a similar fashion. Instead, the variance may be handled via a "guardband", also called an inter-packet gap, shown as gap 40 in FIG. 3. For example, the packet detector 30 may compare the beginning time $T_B$ of packet 12A with the start of a next reference time $T_{A2}$. In this example, the actual difference is 6½ sample time intervals. However, the resolution of the sample clock in the packet detector 30 does not detect the exact actual amount of phase difference between packet 12A and reference clock $T_A$. The packet detector 30 may only detect a 6 time interval difference between the start of packet 12A and the start of the next reference clock time interval $T_{A2}$. The inter-packet gap 40 accounts for these processing uncertainties.

Other delays and variances in the electrical and optical processing circuitry 38 may also cause variances in the actual time when the packets 12A and 12B are received by the optical packet convergence point 16. For example, the optical packet aligner 32 may not delay packets precisely the amount of time specified by delay value 36 in FIG. 2. Other variances may also exist in the amount of time required for making certain routing or switching decisions. The amount of gap 40 is selected to account for these variances. The delta value Δ may also be varied to account for some median or proportional amount of variance in the processing time.

The amount of gap 40 required between each packet or cell can be reduced by decreasing these variances. For example, increasing the resolution of the sample clock used for detecting the packets 12, increasing the precision of the delay times provided by optical packet aligner 32, etc. The reference clock period $T_A$ might or might not include the guardband 40, since the guardband can be handled in other ways.

The reference clock 18 may also be operated at a very high frequency for typical electronic designs, and thus an approach requiring minimum logic at this high speed may be preferred. There may also be a distinction between the high-frequency sample clock and the logic which converts the sampled clock value into packet aligner controls. The conversion logic can run at a slower speed, and can compensate for any delay in the conversion. However, in one embodiment, the conversion logic would preferably run in a fixed amount of time whose delay could be compensated for by the packet delay calculator 34.

The reference clock 18 for a given packet can also be fed forward ahead of time, since it takes some amount of time for the conversion of the reference clock to the controls for packet delay calculator 34, and the programming and any settling time for the packet aligner 32. This is relatively simple since it is trivial to add fixed delays to the optical path. Due to the various components in a given optical path, possibly including constant delays in the packet aligner 32 itself, a fixed adjustment might be made to the reference clock 18 to compensate for the combined delay contributed by those elements. The reference clock 18 might also have more precision than the packet aligner 32, with the extra precision being used to round the sampled reference clock value prior to converting it to the delay value 36.

Optical Packet Aligners

FIGS. 4-7 show examples of optical packet aligners 32 (FIG. 2) that could be used for delaying optical packets according to a calculated phase difference between a reference clock and an incoming packet. It should be understood that any type of optical packet aligner can be used and the devices shown in FIGS. 4-7 are only a few examples. For example, the optical packet aligner could use multiple different selectable delay paths of different physical lengths, delay paths of different or similar physical lengths that are selectively connected together, one of more delay paths that are traversed by the optical packet a selectable number of times, delay paths that use different materials that provide different propagation speeds, etc. The delay value 36 in FIG. 2 can be used in any of these optical packet aligners to control the amount of packet delay.

Figure 4:
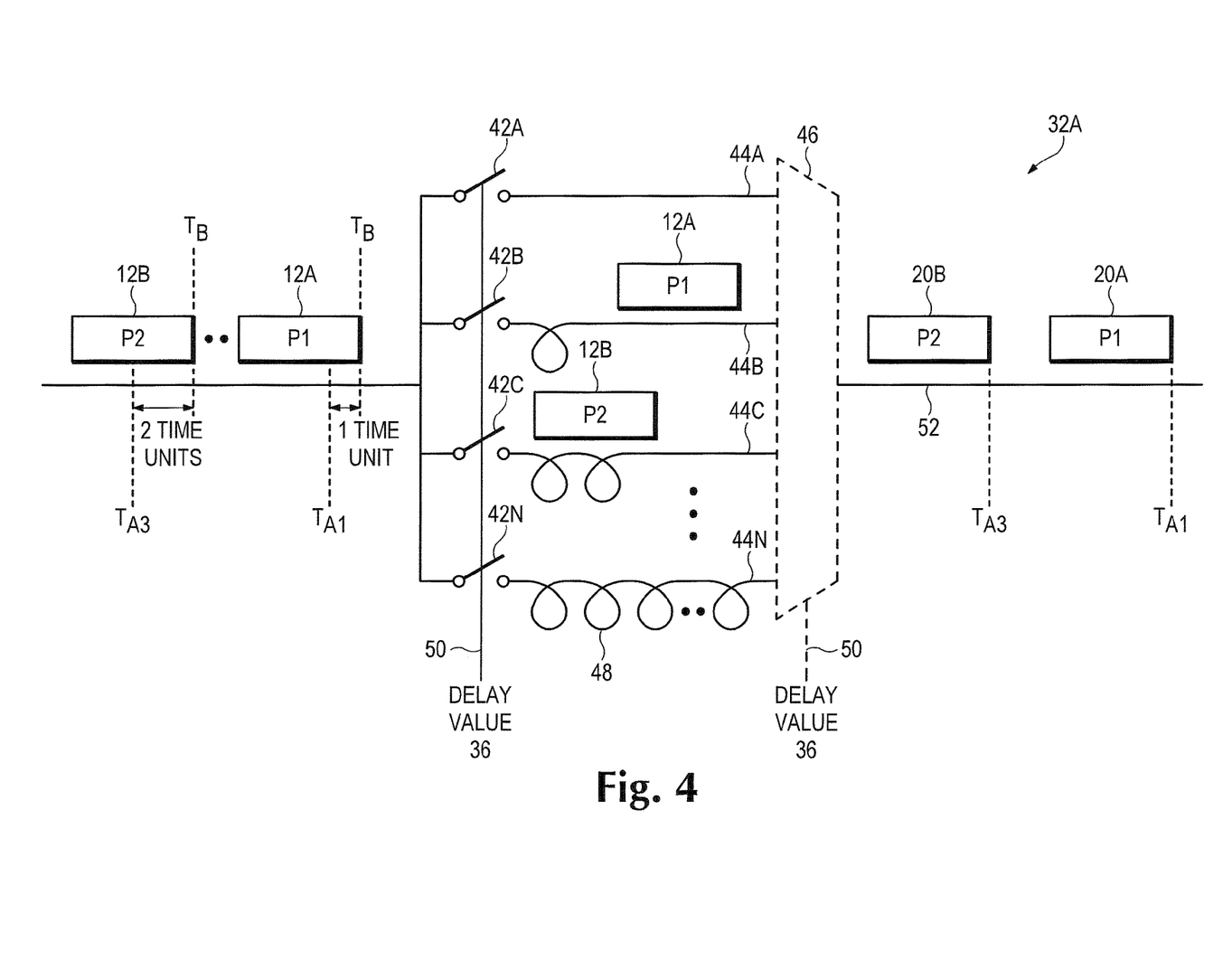
FIGS. 4-7 show examples of different optical packet aligners that may be used with the optical packet synchronizer.

Referring to FIG. 4, a first example of an optical packet aligner 32A includes multiple different delay paths 44A-44N that each may have a different optical delay path length. These different optical delay path lengths are represented by different numbers or lengths of optical fiber loops 48. For example, path 44A has a shortest optical delay path length and path 44N may have the longest optical delay path length.

The optical delay path length is associated with the amount of time the packet is delayed. For example, optical path 44B may create a delay of 1 ns, optical path 44C may create a delay of 2 ns, etc. Again, this is just for illustration purposes, and the actual delay times can vary according to the particular packet aligner and the desired delay values. Further, the delay paths 44 may not actually have different numbers of optical loops but may alternatively be non-looped delay paths of different lengths. In yet another embodiment, the delay paths 44 could use different materials that provide different propagation times.

The packet detector 30 and clock delay calculator 34 in FIG. 2 determine the amount of delay that is required for each packet. For example, it may be determined that the packet 12A needs to be delayed 1 time unit and packet 12B needs to be delayed 2 time units. The delay value 36 is sent to an input 50 that closes a switch 42 associated with the corresponding delay value 36. For example, the required one time unit delay value calculated for packet 12A may close switch 42B. Accordingly, the packet 12A is sent over optical delay path 44B and delayed one time unit.

Similarly, packet 12B is calculated to require a two time unit delay. A two time unit delay value is applied to input 50 which closes switch 42C and causes packet 12B to travel over optical delay path 44C. Optical delay path 44C provides a longer delay than delay path 44B and causes packet 12B to be delayed two time units. The optically delayed packets 20A and 20B on paths 44B and 44C respectively are merged onto output 52, where they are now aligned with the phase of reference clock periods $T_A$.

In one embodiment, the different delay paths 44 are merged through an optical combiner. In an alternative embodiment, a multiplexer 46 may be used instead of, or in combination with, the switching circuit 42 for selecting the delay path 44 used for delaying the packets. For example, the packets 12 may be sent over all of the delay paths 44 at the same time with the multiplexer 46 then connecting the delay path 44 associated with the delay value 36 with output 52.

Figure 5:
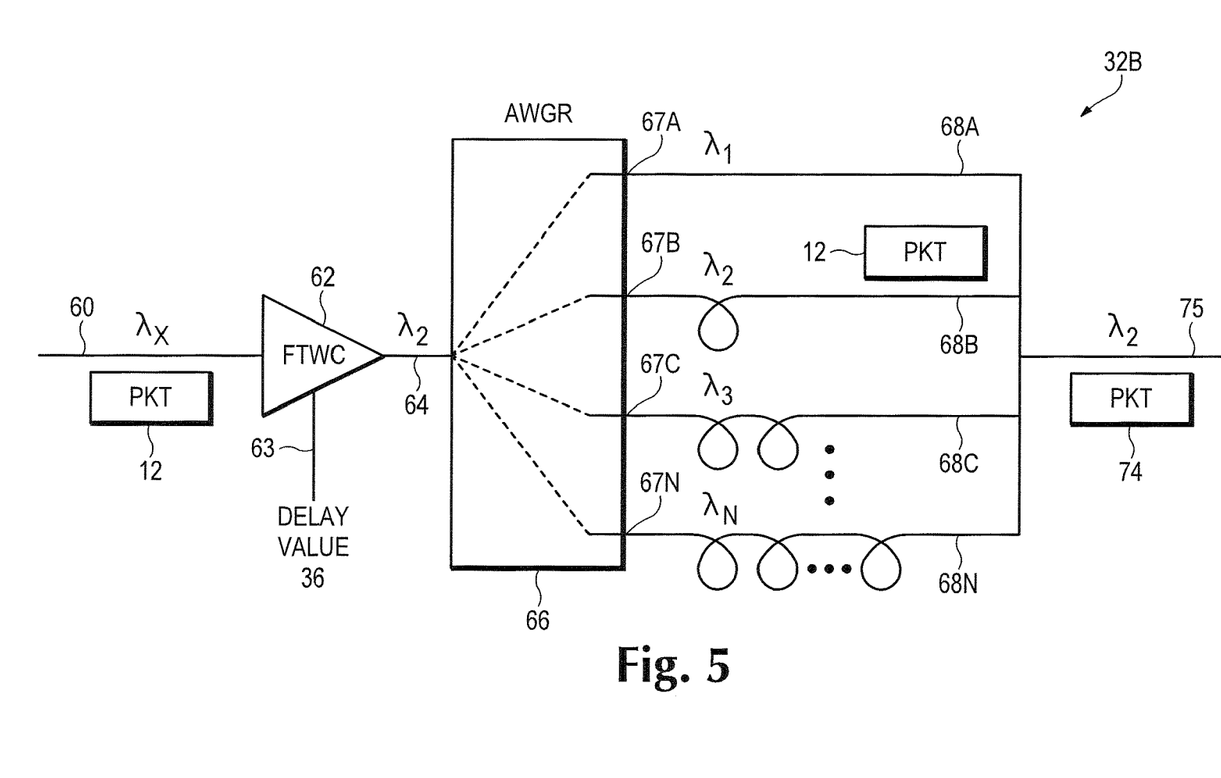
Figure 6:
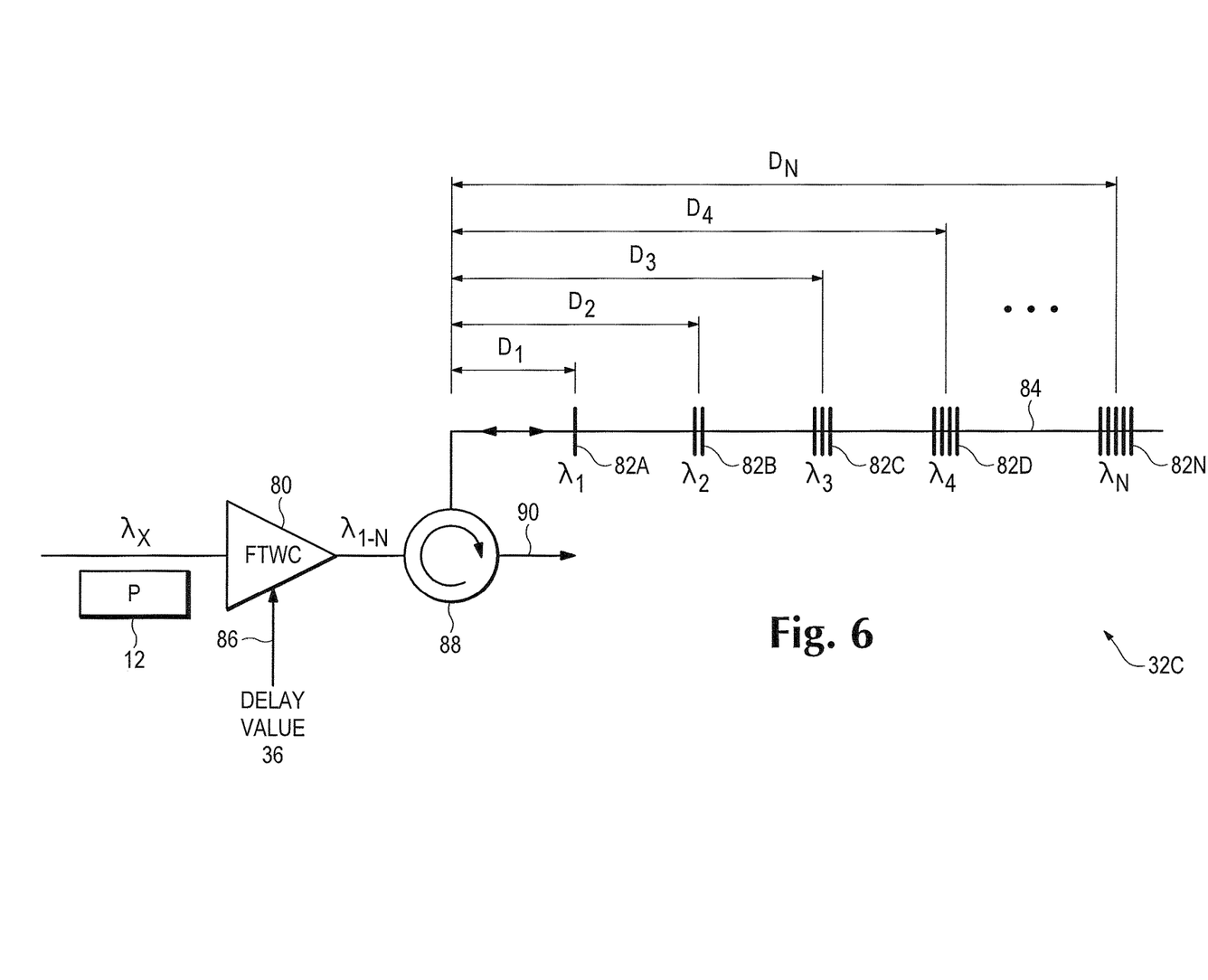

FIGS. 5 and 6 show other optical packet aligners that use Fast Tunable Wavelength Converters (FTWCs) for selectively controlling packet delay. In FIG. 5, a FTWC 62 receives a packet 12 at a particular wavelength $\lambda_x$ on input 60. A delay value 36 provided on input 63 is associated with the amount of packet delay calculated by the packet delay calculator 34 in FIG. 2. The FTWC 62 varies the wavelength $\lambda_x$ to another wavelength according to the delay value 36 supplied on input 63.

The packet 12 output from FTWC 62 at the second converted wavelength is then input to an Array WaveGuide Router (AWGR) 66. The AWGR 66 connects the packet 12 to different outputs 67 according to the converted packet wavelength. For example, an optical packet 12 received at converted wavelength $\lambda_1$ may be sent to output 67A and an optical packet 12 received at converted wavelength $\lambda_2$ may be sent to output 67B, etc.

The length of optical delay paths 68 connected to outputs 67 are configured to correspond to the delay value 36 on input 63 and the corresponding wavelength output from FTWC 62. For example, a delay value of 2 ns may be associated with wavelength $\lambda_2$. Accordingly, output 67B is connected to an optical delay path 68B that delays packet 12 approximately 2 ns. As described above in FIG. 3, the length of optical delay paths 68, or the delay values provided on input 63, can be adjusted to account for other fixed and variable delays that may exist in the optical switching system. Thus, the packet 74 output from optical packet aligner 32B is delayed by an amount associated with the delay value 36 on input 63.

The packet on the selected optical path 68 may alternatively be connected to the output 75 through a multiplexer or some other connection circuitry as similarly shown by multiplexer 46 in FIG. 4. Further, another FTVC might be use, 1 necessary, to convert the selected wavelength $\lambda_2$ for packet 74 on output 75 back to the original wavelength $\lambda_x$.

FIG. 6 uses a FTWC 80 followed by a series of Fiber Bragg Gratings 82 corresponding with different selectable wavelengths. Each grating 82 is located at spaced distances along a fiber 84. For example, each grating 82 may be spaced to provide a 1 ns delay. A delay value 36 is calculated for each packet 12 by the packet delay calculator 34 in FIG. 2 (e.g., 1 . . . 10) and sent to input 86 on the FTWC 80.

The FTWC 80 converts the wavelength $\lambda_x$ for the optical signal carrying the packet 12 to a second wavelength $\lambda_{1-N}$ corresponding to the delay value 36 on input 86. Each grating 82A-82N reflects a different optical wavelength and is located at a different distance on fiber 84. For example, a packet with wavelength $\lambda_3$ will travel over fiber 84 a distance $D_3$ to grating 82C and then is reflected back through redirector 88 to output 90. Thus, each distance $D_1$-$D_N$ along fiber 84 is selected to correspond with a particular packet delay value 36.

Figure 7:
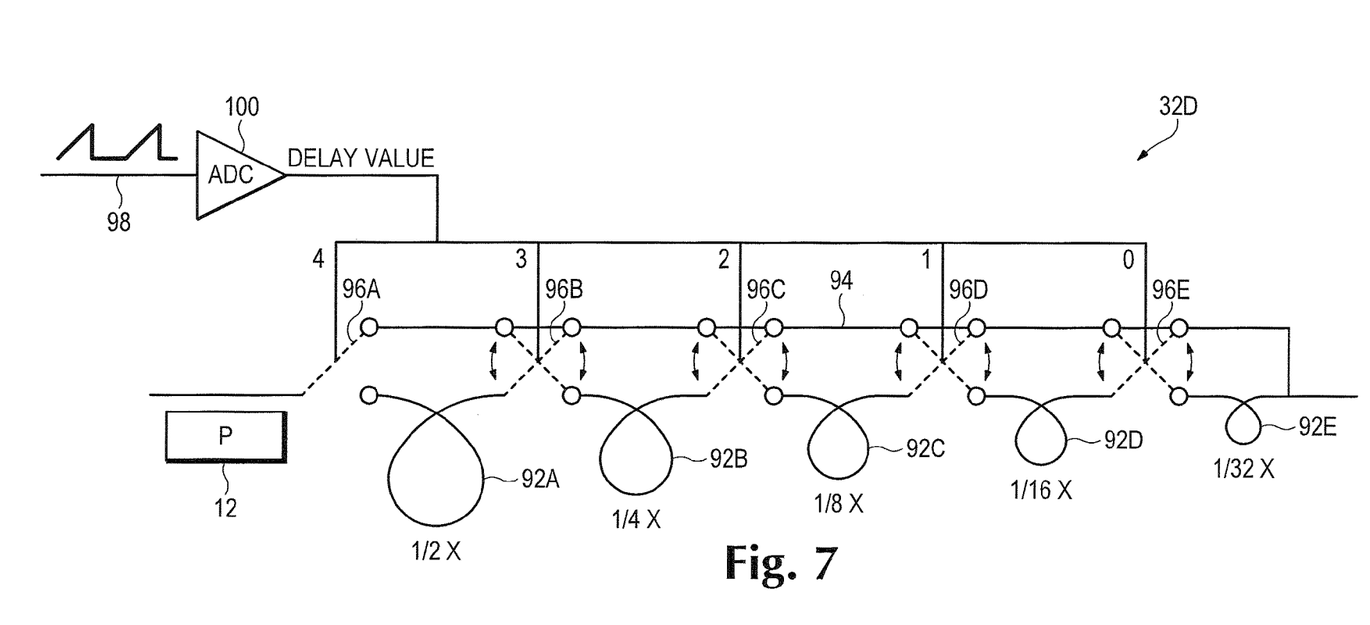

FIG. 7 shows yet another optical packet aligner 32D that includes a cascaded series of exponentially sized optical delay loops (delay paths) 92A-92E, where each loop 92 is optionally switched in or out of the fiber path 94. In this example, the series of optical delay paths 92A-92E each have graduated lengths of ½*X, ¼*X, ⅛*X, ¹⁄₁₆*X, and ¹⁄₃₂*X, respectively, down to some smallest required granularity. The value X represents some predetermined optical delay line length associated with, for example, one packet delay time, or one cell time.

It should again be understood that different optical delay path lengths 92 are illustrated as different loop sizes. This is purely for illustration purposes and the optical delay paths 92 may or may not actually be looped optical paths. For example, the different optical delay paths 92 could be provided by an optical integrated circuit that switches an optical signal along different selectable wave guide paths. Alternatively, the delay paths 92 could use different materials that provide different propagation delays.

Only five optical delay paths 92A-92E are shown in FIG. 7, but any number of delay paths at any selectable granularity and length can be used. With this cascaded series approach, optical packet delays are generated from 0 (possibly a constant value for the sum of the bypass paths), to $1½^n*X$, where the last delay line is of size $½^n*X$. In this embodiment, packets can be easily aligned to a precision of approximately:

$$½^n*X \pm \epsilon.$$

Each cascaded delay line 92 is connected or disconnected to each other through a series of optical switches 96A-96E that may be optically or electronically controlled. In one example, the optical switches 96 may be provided by a Photonic Integrated Circuit (PIC) or other optical waveguide circuitry.

In this example, an analog delay value is provided at input 98 of the optical packet aligner 32D. This, of course, is only one example, and the delay value on input 98 could also be a digital value, such as from a counter in packet delay calculator 34. In this embodiment, an Analog to Digital Converter (ADC) 100 converts the analog signal on input 98 into a digital value that activates the different switches 96A-96E. For example, a digital binary value of 01011 (11 decimal) may close switches 96B, 96D, and 96E.

In one example, a packet may arrive just over halfway through a reference clock period. Accordingly, the assigned binary delay value would be just over ½ and would need to select at least ½ packet delay. Accordingly, a binary value of 10000 would close digital switch 96A and leave open all other digital switches 96B-96E. A packet arriving just under halfway through a reference clock period may need slightly less than ½ packet delay. The packet could get the required packet delay, for example, using the concatenation of the delay lines 92B-92E starting with ¼*X. Accordingly, a binary delay value of 01111 would be generated that opens digital switch 96A and closes switches 96B-96E. While the order of the optical delay paths is preferably from largest to smallest as shown, in some embodiments ordering the delay paths from smallest to largest, or in some other order, may be desirable.

Optical Packet Convergence Points

Figure 8:
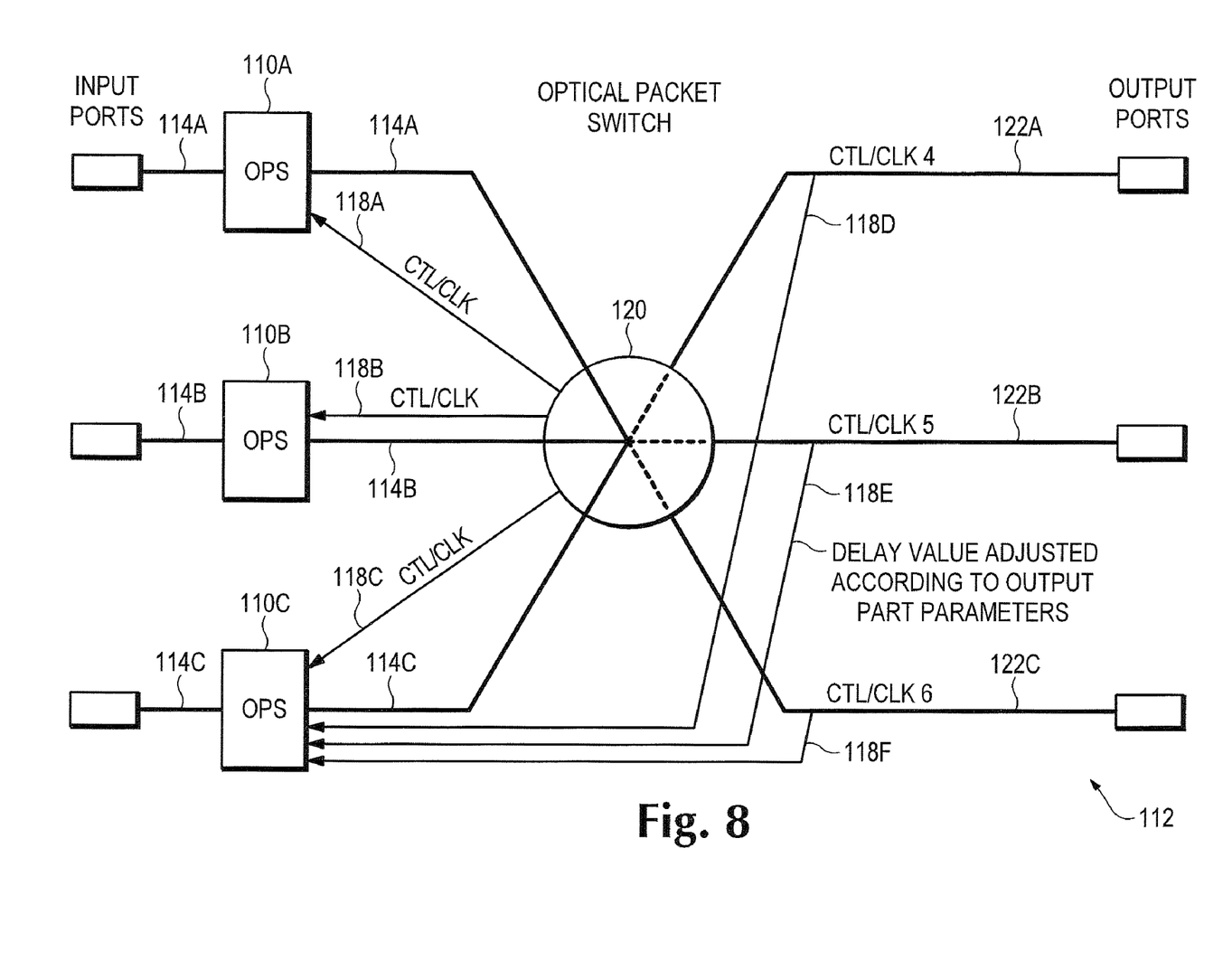
FIG. 8 shows one example of multiple optical packet synchronizers used at different convergence points in an optical packet processing system.
Figure 9:
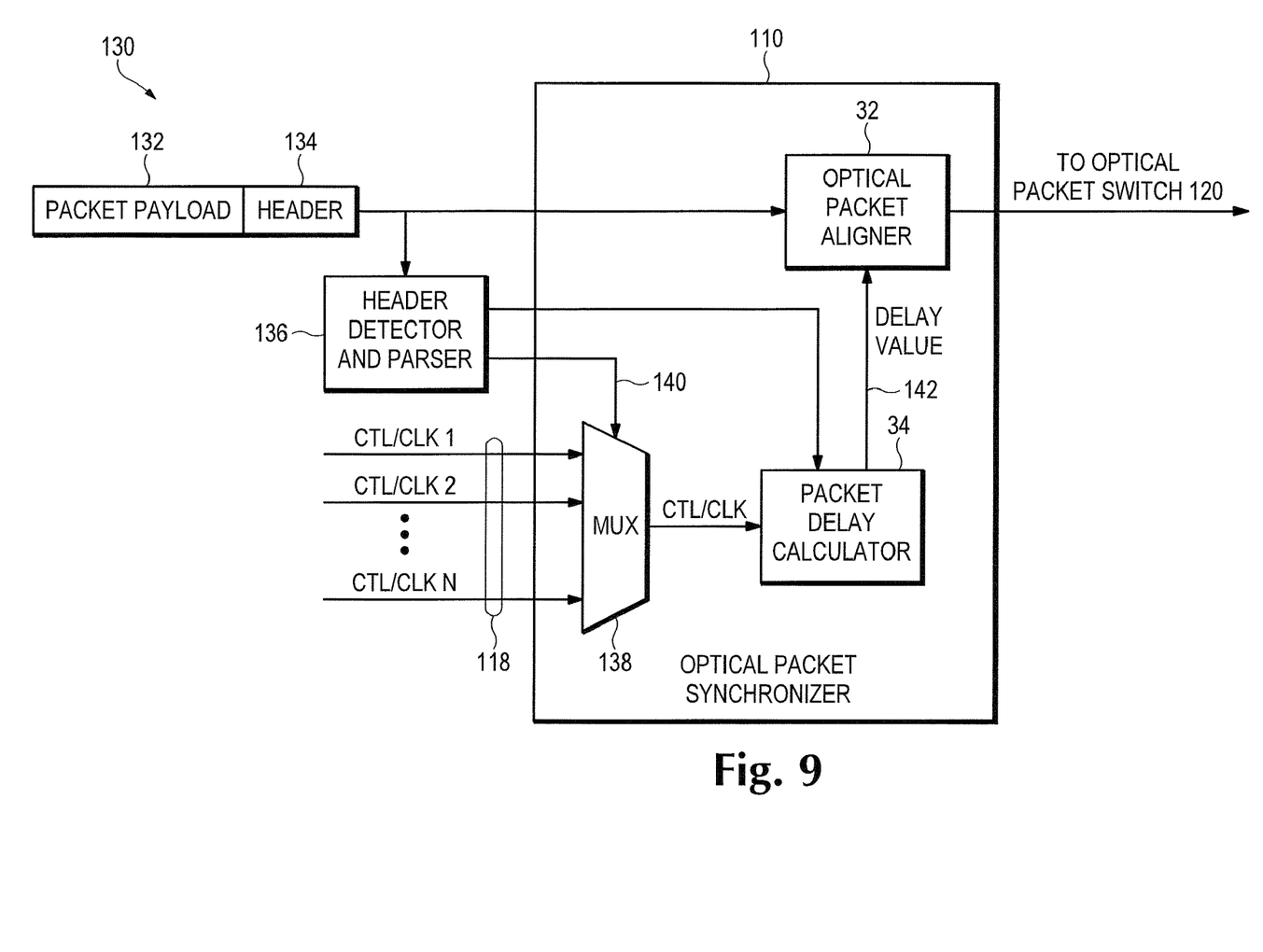
FIG. 9 shows one of the optical packet synchronizers from FIG. 8 in more detail.
Figure 10:
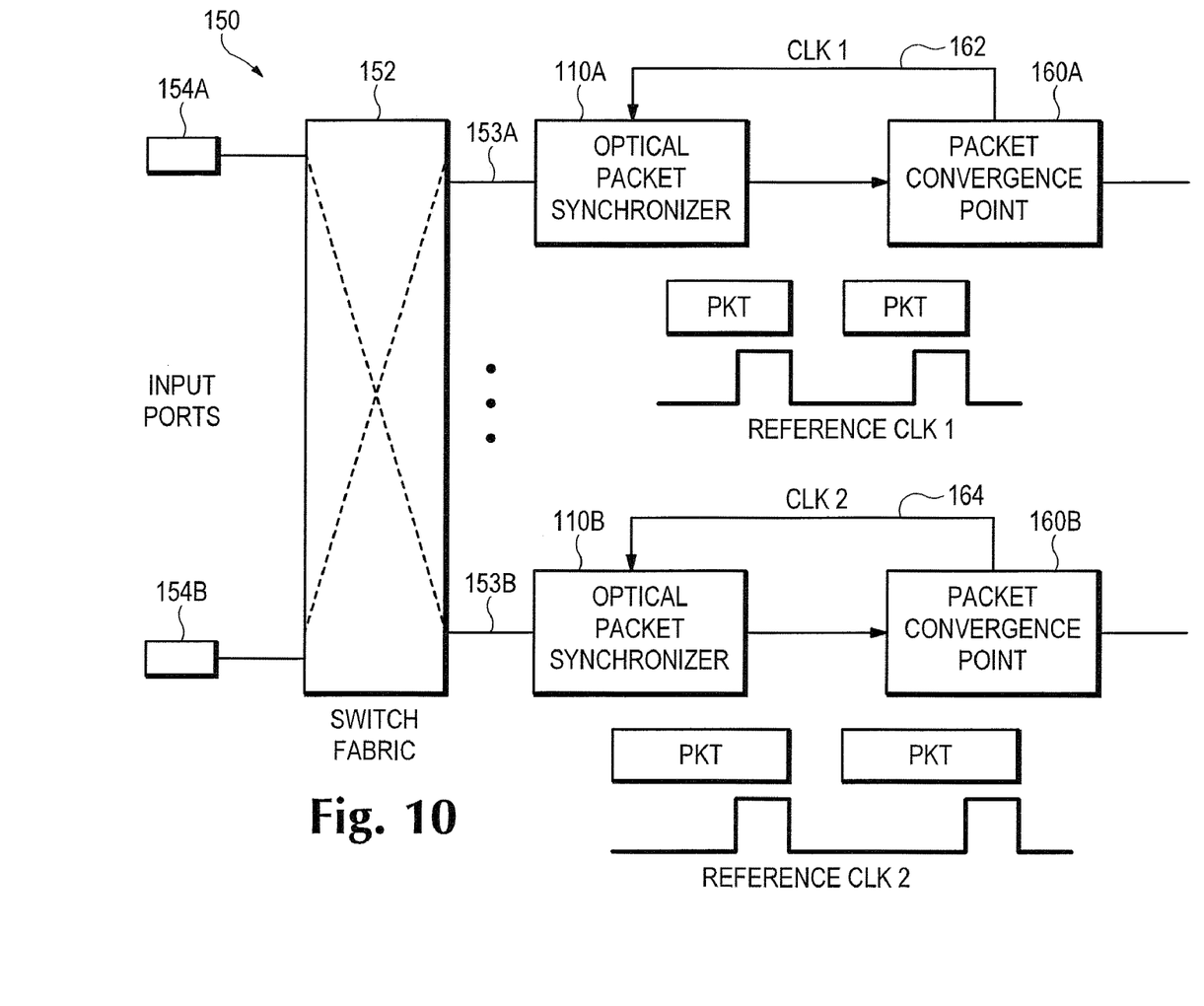
FIG. 10 shows another example of where optical packet synchronizers can be located in a optical packet processing system.

FIGS. 8-10 show different examples of where and how optical packet synchronizers 110 may be used in an optical packet switching device 112. The optical packet synchronizers 110 can support separate alignment constraints and timing on different data paths 114. For example, in FIG. 8, separate input ports or paths 114A-114C may be associated with different types of packets, different packet lengths, or different data transmit rates. Therefore, each data path 114A, 114B, and 114C may have a different associated reference clock domain or other different timing characteristics. Accordingly, different control signals and/or clock signals 118A, 118B, and 118C may be supplied to the different optical packet synchronizers 110A, 110B, and 110C, respectively, for providing different packet delay values.

The optical delay value calculations for packets on each input path 114 may also vary depending on which output path 122A, 122B, and 122C is selected by optical packet switch 120. For example, the cell size, transmit speed, and/or other characteristics of the output paths 122 may differ. Accordingly, the optical packet delays provided by the optical packet synchronizers 110 can be customized for the particular output path 122 selected by packet switch 120.

The optical packet synchronizers 110A-110C could also account for incoming data of widely differing speeds. For example, link 114A may be half the speed of link 114C. The packet delay provided by optical packet synchronizer 110A is appropriately adjusted to account for the slower-arriving data on the half speed link 114A. If the desire is for the nth byte of the aligned packet (for example, the end of the header) to reach convergence point 120 at a certain delay, the control and/or clock signals 118A, or the operation of the corresponding packet delay calculator 34, is then adjusted based on the arriving data speed for link 114A.

The control and/or clock signals 118 can adjust the associated amount of packet delay provided by the optical packet synchronizers 110 according to dynamically varying parameters associated with the input lines 114, optical packet switch 120, or output lines 122. For example, the packet input rate, processing rate, or output rate can vary at a particular packet convergence point, such as an input link 114, optical packet switch 120, or output link 122. The control and/or clock signals 118 can be used to notify the associated optical packet synchronizer 110 to accordingly increase or decrease the amount of packet delay.

FIG. 9 shows one embodiment of the optical packet synchronizer 110 shown in FIG. 8. A packet 130 includes a packet payload 132 and a packet header 134. The packet header 134 is shown at the start of the packet for illustrative purposes. In some embodiments, the header might appear later in the packet (in the middle of the packet payload), though generally at a fixed offset. The packet 130 is received by a header detector and parser unit 136. The control and/or clock signals 118 associated with some or all of the output ports 122 are received by a multiplexer 138.

The parser unit 136 determines which output path 122 in FIG. 8 will be used to route the packet 130. The parser unit 136 generates a control signal 140 associated with the control and/or clock signals 118 associated with the identified output port 122. The selected reference clock and/or any other necessary control parameters 118 are then sent to the packet delay calculator 34 for deriving a delay value 142 for the packet 130. The identified delay value 142 is sent to the optical packet aligner 32 for optically synchronizing the packet 130 with the identified output port 122. The packet delay calculator 34 can use knowledge of the identified output port 122, as provided by control signal 140, to account for any delays or timing unique to the selected output port.

FIG. 10 shows yet another example of other locations where the optical packet synchronizer 110 may be located in an optical packet switching system 150. In this example, an asynchronous switch fabric 152 asynchronously connects packets from different inputs 154A and 154B to different outputs 153A and 153B. Optical packet synchronizers 110 similar to those described above either in FIG. 2 or FIG. 9 are coupled between the outputs 153 of switch fabric 152 and packet convergence points 160. The packet convergence points 160 can be associated with an output port or any other internal location in the optical packet switching system 150 that requires packet synchronization.

In this example, optical packet synchronizer 110A synchronizes packets with a reference clock 162, and optical packet synchronizer 110B independently synchronizes packets with a reference clock 164. This embodiment illustrates how the optical packet synchronizers 110 independently operate at one or more different output paths in the optical packet switching system 150.

SUMMARY

An optical data synchronization scheme controls optical aligners in optical switches. In various embodiments, arriving data is compared with an optical convergence point reference and the comparison is used to control an optical delay mechanism.

While described above in the context of an optical packet switch, the optical synchronization may also be used in non-packet applications such as in a Time Division Multiplexing (TDM) switch that synchronizes data received and transmitted on different clock domains. The TDM data associated with different input ports and/or output ports is The TDM data is then delayed according to the comparison between the reference signal and the detected arriving TDM data, a corresponding frame synchronization bit, or flag.

The system described above can use dedicated processor systems, micro-controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either software or electronic or optical hardware.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. An optical packet synchronizer, comprising:
   packet detector circuitry configured to detect a plurality of optical packets;
   packet delay calculation circuitry configured to compare a periodic clock signal with the detected optical packets, wherein the periodic clock signal comprises a series of successive clock periods and the packet delay calculation circuitry is configured to calculate associated amounts of delay required to substantially align the plurality of optical packets with the series of successive clock periods of the periodic clock signal;
   an optical packet aligner configured to delay the plurality of optical packets by the associated amounts of delay calculated by the packet delay calculation circuitry;
   selection circuitry configured to select between multiple different clock signals associated with different outputs; and
   a parser unit configured to identify one of the outputs where the optical packets are directed and cause the selection circuitry to select one of the different clock signals associated with the identified one of the outputs as the periodic clock signal.

2. The optical packet synchronizer according to claim 1 wherein a beginning of each of the plurality of optical packets is aligned with the beginning of a different one of the successive clock periods.

3. The optical packet synchronizer according to claim 2 wherein the optical packet aligner includes different selectable optical delay paths that create different packet delays that correspond to different the associated amounts of delay calculated by the packet delay calculation circuitry.

4. The optical packet synchronizer according to claim 3 wherein the optical packet aligner includes switching circuitry that selectively connects the optical packets to one of the different optical delay paths according to the associated amounts of delay.

5. The optical packet synchronizer according to claim 4 wherein the switching circuitry includes:
   a Fast Tunable Wavelength Converter (FTWC) that converts a first wavelength associated with the optical packets into a second wavelength that varies with the associated amounts of delay; and
   an Array Waveguide Router (AWGR) or diffraction grating that causes the optical packets, based on the corresponding second wavelength, to travel along a selected optical delay path that varies with the associated amounts of delay.

6. The optical packet synchronizer according to claim 1 wherein the optical packet aligner includes cascaded delay paths that are each associated with fractional portions of the successive clock periods, the cascaded delay paths selectively connected together to generate an overall packet delay corresponding to the associated amounts of delay.

7. The optical packet synchronizer according to claim 2 including multiple different optical packet aligners and associated packet delay calculation circuitry each independently synchronizing the optical packets with the different clock signals associated with different packet convergence points.

8. The optical packet synchronizer according to claim 7 wherein the different optical packet aligners and associated packet delay calculation circuitry are located at the different outputs.

9. The optical packet synchronizer according to claim 1 wherein the packet delay calculation circuitry determines the associated amounts of delay according to an amount of identified phase offset between the optical packets and the successive clock periods of the periodic clock signal.

10. The optical packet synchronizer according to claim 9 wherein the packet delay calculation circuitry accounts for fixed and/or variable processing delays when calculating the associated amounts of delay.

11. The optical packet synchronizer according to claim 10 wherein the packet delay calculation circuitry centers or repositions the optical packets to compensate for the variable processing delays.

12. The optical packet synchronizer according to claim 1, wherein the packet delay calculation circuitry is configured to compare the selected one of the different clock signals with the optical packets and calculate an amount of delay required to substantially align a corresponding portion of each successive one of the plurality of optical packets with a beginning of a different one of a series of successive clock periods from the selected one of the different clock signals; and wherein the optical packet aligner is configured to delay each of the plurality of optical packets directed to the identified one of the outputs by the amount of delay calculated by the packet delay calculation circuitry, wherein the delay applied to each of the plurality of optical packets aligns each of the optical packets with a different one of the successive clock periods from the selected one of the different clock signals.

13. The optical packet synchronizer according to claim 12 wherein the selection circuitry is configured to identify the outputs according to data contained in the optical packets and cause the selection circuitry to output the different clock signals received from convergence points located on the identified outputs.

14. The optical packet synchronizer according to claim 1 wherein the packet delay calculation circuitry identifies fractions of reference time periods between the detected optical packets and the periodic clock signal and uses the identified fractions to calculate the associated amounts of delay.

15. An optical data processing system, comprising:
different optical synchronization points configured to receive optical data substantially synchronized with different associated clock signals;
optical data synchronizers configured to align the optical data asynchronously received on data lines with the different clock signals associated with the different optical synchronization points;
parsor units configured to receive the different clock signals and output the different clock signals to the optical data synchronizers associated with the different optical synchronization points.

16. The optical data processing system according to claim 15 wherein the parser units are configured to identify outputs where the optical data is directed and output the clock signals associated with the identified outputs.

17. The optical data processing system according to claim 15 wherein the optical data synchronizers include:
packet detector logic that detects optical packets asynchronously arriving on the data lines;
packet delay calculation logic that generates a delay value associated with an amount of phase offset between the associated clock signals and a corresponding portion of each of the optical packets; and
an optical packet aligner that applies a selectively varied amount of optical packet delay to the optical packets according to the delay value.

18. The optical data processing system according to claim 15 including:
a packet switching element that switches, routes, and/or connects the optical data from multiple different inputs to multiple different outputs, wherein the optical data synchronizers synchronize the optical data with the clock signals associated with the multiple different inputs.

19. The optical data processing system according to claim 18 wherein the optical data synchronizers are coupled to the multiple different inputs of the packet switching element and each independently synchronize the optical data with the clock signals associated with the multiple different inputs.

20. The optical data processing system according to claim 15 including selection circuitry configured to select between the different clock signals according to information contained in the optical data.

21. A method, comprising:
identifying times associated with optical data asynchronously received on a data line;
receiving different reference signals associated with different optical synchronization points;
identifying one of the optical synchronization points used for the optical data;
outputting one of the different reference signals for the identified one of the optical synchronization points as a periodic clock signal;
comparing the identified times with the periodic clock signal;
deriving different delay values according to the comparison between the identified times and the periodic clock signal; and
delaying the optical data by the different delay values, wherein the different delay values align the optical data with different clock periods for the periodic clock signal.

22. The method according to claim 21 further comprising:
identifying one of multiple outputs where the optical data is directed;
identifying one of the optical synchronization points located on the identified one of the multiple outputs; and
using one of the reference signals associated with the identified one of the optical synchronization points as the periodic clock signal.

23. The method according to claim 21 including:
detecting optical data represented by asynchronously received optical packets;
identifying an amount of phase offset between the periodic clock signal and the optical packets; and
selectively varying an amount of delay applied to each of the optical packets according to the amount of phase offset.

24. The method according to claim 21 including:
switching, routing, and/or connecting optical data asynchronously received from multiple different inputs;
synchronizing the optical data with one of the optical synchronization points associated with an identified one of the multiple different inputs.

25. A system, comprising:
means for identifying respective times associated with successive portions of optical data asynchronously received on a data line;
means for receiving different reference signals associated with different optical synchronization points;
means for identifying one of the optical synchronization points used for the optical data;
means for outputting one of the different reference signals for the identified one of the optical synchronization points as a periodic clock signal;
means for comparing the identified respective times with the periodic clock signal, wherein the periodic clock signal comprises a series of successive clock periods;
means for deriving different associated delay values with each of the successive portions of the optical data according to the comparison between each of the identified respective times and a beginning of an associated one of the series of successive clock periods for the periodic clock signal; and
means for delaying each of the successive portions of the optical data by the different associated delay values, wherein the different associated delay values align each of the successive portions of optical data with a different one of the successive clock periods for the periodic clock signal.

26. The system according to claim 25 including means for identifying one of multiple outputs for the optical data, and outputting one of the reference signals from one of the optical synchronization points located on the identified one of the outputs.

27. The system according to claim 25 including:
means for receiving optical packets;
means for identifying an amount of phase offset between the series of successive clock periods and corresponding beginnings of the optical packets; and
means for selectively varying an amount of optical packet delay applied to each of the optical packets according to the amount of phase offset.

28. The system according to claim 25 including:
means for switching, routing, and/or connecting the optical data asynchronously received from multiple inputs to one or more outputs;
means for synchronizing the optical data with one of the different reference signals associated with an identified one of the inputs.

29. A computer readable medium containing instructions when executed by a processing device or circuit, cause the processing device or circuit to perform operations comprising:
identifying respective times associated with optical data asynchronously received on a data line;
receiving different reference signals associated with different optical synchronization points on different outputs;
identifying one of the different outputs for outputting the optical data;
selecting one of the different reference signals associated with one of the different optical synchronization points located on the identified one of the outputs and using the selected one of the reference signals as a periodic clock signal;
comparing each of the identified respective times with the periodic clock signal, wherein the periodic clock signal comprises a series of successive clock periods;
deriving different delay values associated with the optical data according to the comparison between each of the identified respective times and a beginning of an associated one of the series of successive clock periods; and
delaying the optical data by the different delay values, wherein the different delay values align the optical data with a different one of the successive clock periods for the periodic clock signal.

* * * * *